United States Patent
Jackson, Jr.

(10) Patent No.: US 7,149,080 B2
(45) Date of Patent: Dec. 12, 2006

(54) FLAT PANEL COMPUTER HAVING AN INTEGRALLY HOUSED FLAT PANEL DISPLAY

(75) Inventor: Louis R. Jackson, Jr., Tomball, TX (US)

(73) Assignee: Hewlett-Packard Development, LP., Houston, TX (US)

( * ) Notice: Subject to any disclaimer, the term of this patent is extended or adjusted under 35 U.S.C. 154(b) by 0 days.

(21) Appl. No.: 11/173,015

(22) Filed: Jun. 30, 2005

(65) Prior Publication Data

US 2005/0243505 A1    Nov. 3, 2005

Related U.S. Application Data

(63) Continuation of application No. 09/832,387, filed on Apr. 11, 2001.

(51) Int. Cl.
H05K 7/14 (2006.01)
H05K 7/02 (2006.01)

(52) U.S. Cl. ............... 361/683; 361/681; 345/905; 248/917

(58) Field of Classification Search ........ 361/681–687; 348/794; 40/530; 248/917–923; 345/901–905
See application file for complete search history.

(56) References Cited

U.S. PATENT DOCUMENTS

| | | | |
|---|---|---|---|
| 4,832,419 A | 5/1989 | Mitchell et al. | |
| 4,980,676 A | 12/1990 | Nomura et al. | |
| 5,100,098 A * | 3/1992 | Hawkins | 248/291.1 |
| 5,119,204 A * | 6/1992 | Hashimoto et al. | 348/794 |
| 5,157,585 A | 10/1992 | Myers | |
| 5,331,509 A | 7/1994 | Kikinis | |
| 5,355,279 A | 10/1994 | Lee et al. | |
| 5,375,076 A | 12/1994 | Goodrich et al. | |
| 5,396,399 A * | 3/1995 | Blair et al. | 361/681 |
| 5,430,607 A | 7/1995 | Smith | |
| 5,443,237 A | 8/1995 | Stadtmauer | |
| 5,495,389 A | 2/1996 | Dewitt et al. | |
| 5,598,318 A | 1/1997 | Dewitt et al. | |
| 5,610,798 A | 3/1997 | Lochridge | |
| 5,646,819 A | 7/1997 | Hill, III | |
| 5,661,630 A | 8/1997 | Levins et al. | |
| 5,673,169 A | 9/1997 | Wicks | |
| D384,832 S | 10/1997 | Senturia et al. | |
| 5,673,982 A | 10/1997 | Chase et al. | |
| 5,682,182 A * | 10/1997 | Tsubosaka | 345/173 |
| 5,683,068 A | 11/1997 | Chase et al. | |
| 5,786,983 A | 7/1998 | Brenner et al. | |
| 5,793,359 A | 8/1998 | Ushikubo | |
| 5,831,817 A | 11/1998 | Chang | |

(Continued)

FOREIGN PATENT DOCUMENTS

DE    29616175    12/1996

OTHER PUBLICATIONS

IEEE 100 The Authoritative Dictionary of IEEE Standards Terms, Seventh Edition, p. 812.

Primary Examiner—Anatolyu Vortman (57) ABSTRACT

One disclosed embodiment of a personal computer system includes a personal computer integrated entirely within a flat panel display having a single panel shaped housing. The personal computer system also includes a desktop mount integrated into a rear wall of the single panel shaped housing, wherein the desktop mount has a pivotal leg angled outwardly from the rear wall at a central region midway between left and right sides of the single panel shaped housing.

27 Claims, 5 Drawing Sheets

U.S. PATENT DOCUMENTS

| | | | |
|---|---|---|---|
| D404,025 S | 1/1999 | Van Horne et al. | |
| D404,381 S * | 1/1999 | Roderman et al. | D14/375 |
| 5,880,928 A | 3/1999 | Ma | |
| 5,887,837 A * | 3/1999 | Johns et al. | 248/371 |
| 6,016,248 A | 1/2000 | Anzai et al. | |
| 6,097,593 A | 8/2000 | Faranda et al. | |
| 6,098,952 A * | 8/2000 | Tonn | 248/688 |
| 6,108,195 A * | 8/2000 | Behl et al. | 361/681 |
| 6,157,958 A | 12/2000 | Armitage et al. | |
| 6,219,229 B1 | 4/2001 | Lee | |
| 6,246,573 B1 | 6/2001 | Khan et al. | |
| 6,256,192 B1 | 7/2001 | Shannon | |
| 6,282,082 B1 | 8/2001 | Armitage et al. | |
| 6,290,349 B1 | 9/2001 | Silverbrook et al. | |
| 6,301,101 B1 | 10/2001 | Anzai et al. | |
| 6,325,346 B1 * | 12/2001 | Chang et al. | 248/225.11 |
| 6,335,861 B1 | 1/2002 | Ramsey et al. | |
| 6,353,529 B1 | 3/2002 | Cies | |
| 6,366,452 B1 | 4/2002 | Wang et al. | |
| 6,396,472 B1 | 5/2002 | Jacklin | |
| 6,480,243 B1 | 11/2002 | Yamamoto | |
| 6,508,451 B1 * | 1/2003 | Blythe et al. | 248/688 |
| 6,519,146 B1 | 2/2003 | Nagashima et al. | |
| 6,560,094 B1 | 5/2003 | Schmidt | |
| 6,590,151 B1 | 7/2003 | Merk et al. | |
| 6,600,647 B1 | 7/2003 | Girvin et al. | |
| 6,651,943 B1 * | 11/2003 | Cho et al. | 248/122.1 |
| 6,667,759 B1 | 12/2003 | Gerszberg et al. | |
| 6,798,655 B1 | 9/2004 | Nagashima et al. | |
| 6,823,415 B1 | 11/2004 | Asaad et al. | |
| 2002/0188363 A1 | 12/2002 | Ashy | |
| 2002/0196599 A1 | 12/2002 | Misawa | |

* cited by examiner

FLAT PANEL COMPUTER HAVING AN INTEGRALLY HOUSED FLAT PANEL DISPLAY

CROSS-REFERENCE TO RELATED APPLICATION

This is a continuation of co-pending application Ser. No. 09/832,387 filed on Apr. 11, 2001.

FIELD OF THE INVENTION

The present technique relates generally to the field of computer systems, and more specifically to space saving techniques. The present technique is a system and method for configuring a computer system to maximize workspace.

BACKGROUND OF THE INVENTION

Computer systems generally include a computer unit and peripherals. For example, a typical computer unit may include a computer housing having a motherboard, a processor, a hard drive, random access memory (RAM), a disk drive (e.g., a floppy drive, a CD ROM drive, a DVD ROM drive, a ZIP drive, etc.), communication ports, a cooling system (e.g., a fan), a power supply, a modem, a network device, an audio assembly (e.g., a sound card, a speaker, etc.), and other computing devices. The computer system also may include peripherals, such as a monitor, a printer, a scanner, a keyboard, a mouse, speakers, a disk drive or other storage devices, a modem or other communication devices, and various other standalone components. Accordingly, a typical computer system includes a variety of separate components communicating through various ports, such as serial, parallel, PS/2, video, USB, IRDA (infrared), and various other communication protocols. Moreover, each of these components consumes a considerable amount of workspace.

Regardless of the type of computer system (i.e., desktop or portable), a significant amount of workspace is consumed due to the conventional orientation of computer component. For example, desktop units have a large footprint in both horizontal and vertical orientations. Monitors also have a large footprint, which generally increases with the viewable area. Laptop computers consume less space than desktop computers, but are intended for mobile use. For many users, the display screen, the keyboard, and other features are difficult or inconvenient to use. Accordingly, laptop computers are often connected to standard monitors, keyboards, and other desktop devices during non-mobile operation. Moreover, the laptop itself has a considerably large footprint, and also requires extra space for the display to be oriented at a desired viewing angle.

Accordingly, a technique is needed for reducing space requirements for computer systems.

SUMMARY OF THE INVENTION

The present technique is associated with space saving techniques for computer systems and associated electronic devices. A mounting technique is provided for positioning at least a portion of a computing system in a substantially upright orientation to conserve space. The space saving technique also includes an integral computing enclosure having a thin profile, a thin display and a mounting assembly for facilitating a relatively shallow mounting depth for the integral computing enclosure.

Another aspect of the present technique provides a space saving system for a computing device. The space saving system includes a housing for a display and a plurality of computing components, and a mounting assembly for the housing. The mounting assembly is configured for positioning the display in a desired upright orientation. Also, the mounting assembly includes a vertical mount structure for mounting the housing on a substantially vertical surface.

Another aspect of the present technique provides a space saving method for a computing system. The space saving method includes integrating a display assembly with a plurality of computing components in a slim panel enclosure. The method also includes coupling a vertical support assembly to the slim panel enclosure, and facilitating a shallow horizontal depth consumption of the slim panel enclosure.

BRIEF DESCRIPTION OF THE DRAWINGS

The invention will hereafter be described with reference to the accompanying drawings, wherein like reference numerals denote like elements, and.

DETAILED DESCRIPTION OF SPECIFIC EMBODIMENTS

The present technique relates to space saving configurations for computing devices and peripherals to minimize workspace consumption. The technique is widely applicable and can be utilized on desktop computers, portable computers (e.g., notebooks, laptops, palmtops, etc.), servers, monitors, printers, scanners, audio/video devices, docking devices, and various other computing and peripheral devices. The present technique configures computing devices and peripherals in a relatively thin enclosure suitable to be vertically mounted or to be disposed on a horizontal surface in a substantially upright orientation. Accordingly, the workspace (e.g., horizontal area) consumed by the device is substantially reduced. The following detailed description provides exemplary embodiments and applications of the present technique, which should be interpreted broadly to include all computing devices, peripherals and environments.

Figure 1:
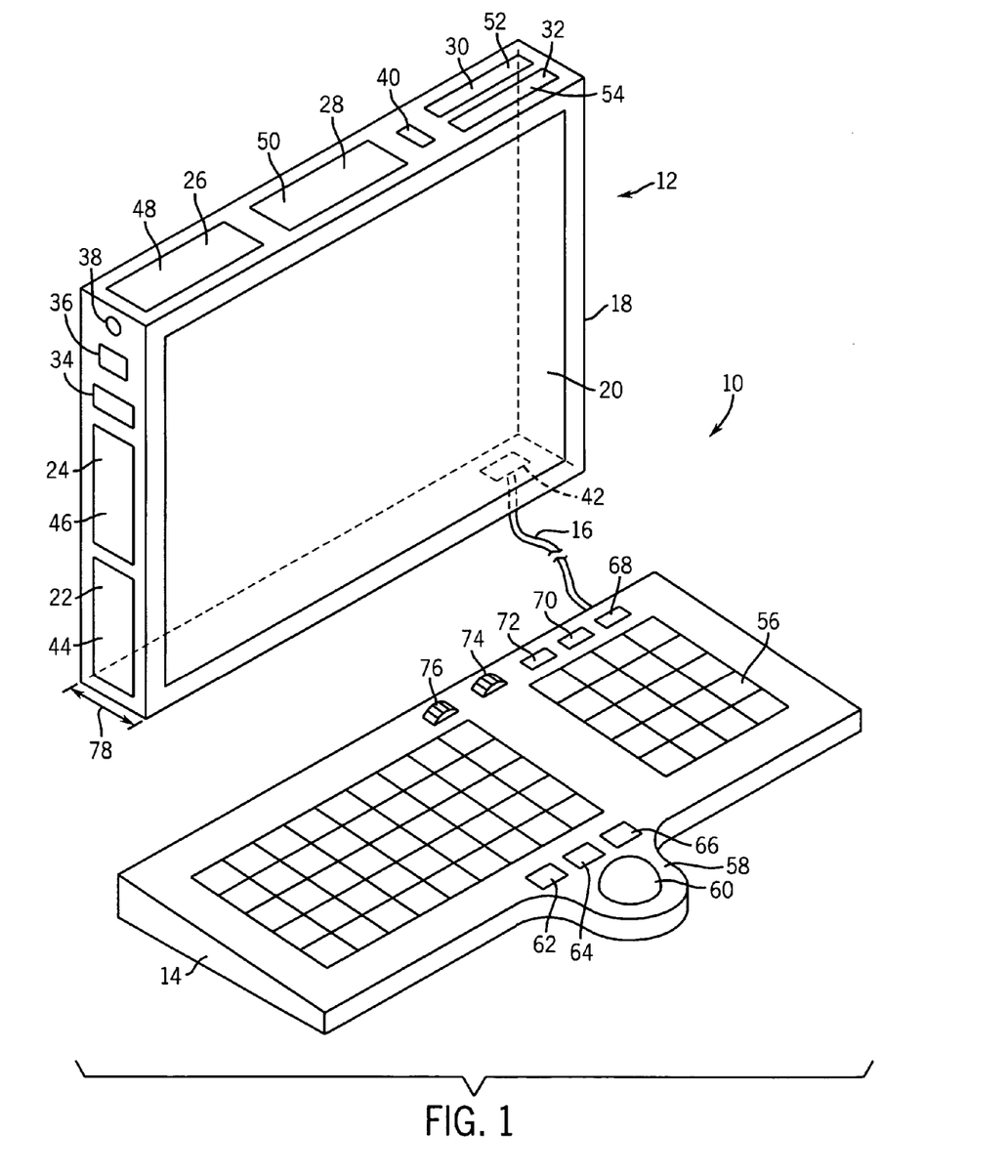
FIG. 1 is a perspective view of an exemplary computer system including a slim computer unit and a user input device.

Referring generally to FIG. 1, an exemplary computer system 10 is illustrated according to one embodiment of the present technique. As illustrated, the computer system 10 includes a flat panel computer 12 communicatively coupled to a keyboard 14 via a cable 16. The flat panel computer 12 includes an enclosure 18 housing a display 20 and a plurality of internal computer components. In this exemplary embodiment, the display 20 may be a flat panel display assembly, which can have one or more display layers such as a liquid crystal display screen, brightness enhancement films, diffusion screens, antiglare and anti-reflective layers, and others. A display cover also may be provided to protect the display 20 during mobile use. For example, the display cover can have a snap-fit, a slide on, or other attachment mechanisms for coupling with the enclosure 18. The display 20 has a viewable area configured for the desired application (e.g., desktop, mobile, desktop/mobile, etc.), which may result in a broad range of display sizes (e.g., 5" to 21"). However, the viewable area can exceed this range for a particular application. The internal computer components can include various electronic components, such as a processor, a data storage device (e.g, a disk drive, random access memory (RAM), a hard drive, etc.), a motherboard, a battery, and other desired devices and software (e.g., operating system, applications, etc.) within the enclosure 18.

The flat panel computer 12, as illustrated in FIG. 1, includes a plurality of bays and ports, such as bays 22, 24, 26, 28, 30 and 32 and ports 34, 36, 38, 40 and 42. The bays 22, 24, 26, 28, 30 and 32 can have integral components installed therein or the bays may be configured for removable insertion of devices. For example, the bays 22, 24, 26, 28, 30 and 32 can removably house devices 44, 46, 48, 50, 52 and 54, respectively, which may include a floppy disk drive, a battery, a network device, a modem, a CD-Rom drive, a CD-RW drive, a DVD-Rom drive, a DVD-Ram drive, a DVD-RW drive, a DVD-R drive, a tape drive, or a variety of other desired electronic components. One or more devices and bays also may be adapted for hot-swapping and plug-n-play device setups. The bays 22, 24, 26, 28, 30 and 32 also can be configured to house a variety of desktop devices, portable devices, and other custom, compact or hybrid devices. For example, bays 30 and 32 may house laptop computer devices, such as PCMCIA cards. The ports 34, 36, 38, 40 and 42 can embody a variety of communication standards and configurations, such as a serial port (e.g., RS-232C, RS-422, RS-423, RS-485, etc.), an audio port, a parallel port, a midi/game port, a video port, a PS/2 port, an SCSI port, an Ethernet port, a modem port, a wireless port (e.g., IRDA, radio frequency, blue tooth, optical, digital, etc.), a USB port, an IEEE 1394 port, and other hot-plugging, plug-n-play, and desired communication ports. As discussed above, the present technique may employ a broad spectrum of components, drives, ports, and configurations, which may utilize existing standards, custom configurations, or emerging technologies and standards. Accordingly, the present technique should be understood to encompass all such technologies and devices in the following discussion.

In one example of the present technique, the cable 16 is coupled to the port 42, which may be a serial port, a PS/2 port, a USB port, an IEEE 1394 port, or another communication port suitable for a keyboard or input/output device. In this exemplary embodiment, the keyboard 14 includes keyboard buttons 56 and a pointing device 58 having a rollerball 60 and buttons 62, 64 and 66. The keyboard 14 also includes buttons 68, 70 and 72 and adjustment dials 74 and 76. The buttons 68, 70 and 72 can be configured to control various functions of the flat panel computer 12, such as powering the flat panel computer 12 and the display 20 on and off, resetting the operating system of the flat panel computer 12, or other desired functions. The adjustment dials 74 and 76 can be used for adjusting a display brightness level, an audio volume level, or other desired features. The keyboard 14 also may have additional buttons, dials, or alternate components for the pointing device 58, as desired for particular applications.

As illustrated in FIG. 1, the flat panel computer 12 of the present technique is relatively compact and integrated to reduce space requirements of the computer system 10. For example, the enclosure 18 has a thickness 78, which is relatively small and uniform throughout the flat panel computer 12. Accordingly, the flat panel computer 12 takes up a relatively small amount of space in the upright orientation as illustrated in FIG. 1.

In terms of workspace, the flat panel computer conserves the horizontal work surface. For example, in a vertical orientation, the horizontal mounting depth is only the thickness 78 of the enclosure 18. At a desired viewing angle, the horizontal mounting depth is simply the projected area from the enclosure 18 onto the mount surface. Also note that reference to a horizontal mount surface should be interpreted broadly to include a variety of angled surfaces. The mounting assembly for the flat panel computer 12 can adapt to a surface (e.g., horizontal, or slightly angled) by adjusting the level of the mount structure, as discussed below with reference to FIG. 8. Furthermore, the use of the keyboard 14 having the pointing device 58 integrated within the keyboard reduces space consumption by the computer system 10.

Figures 2, 3:
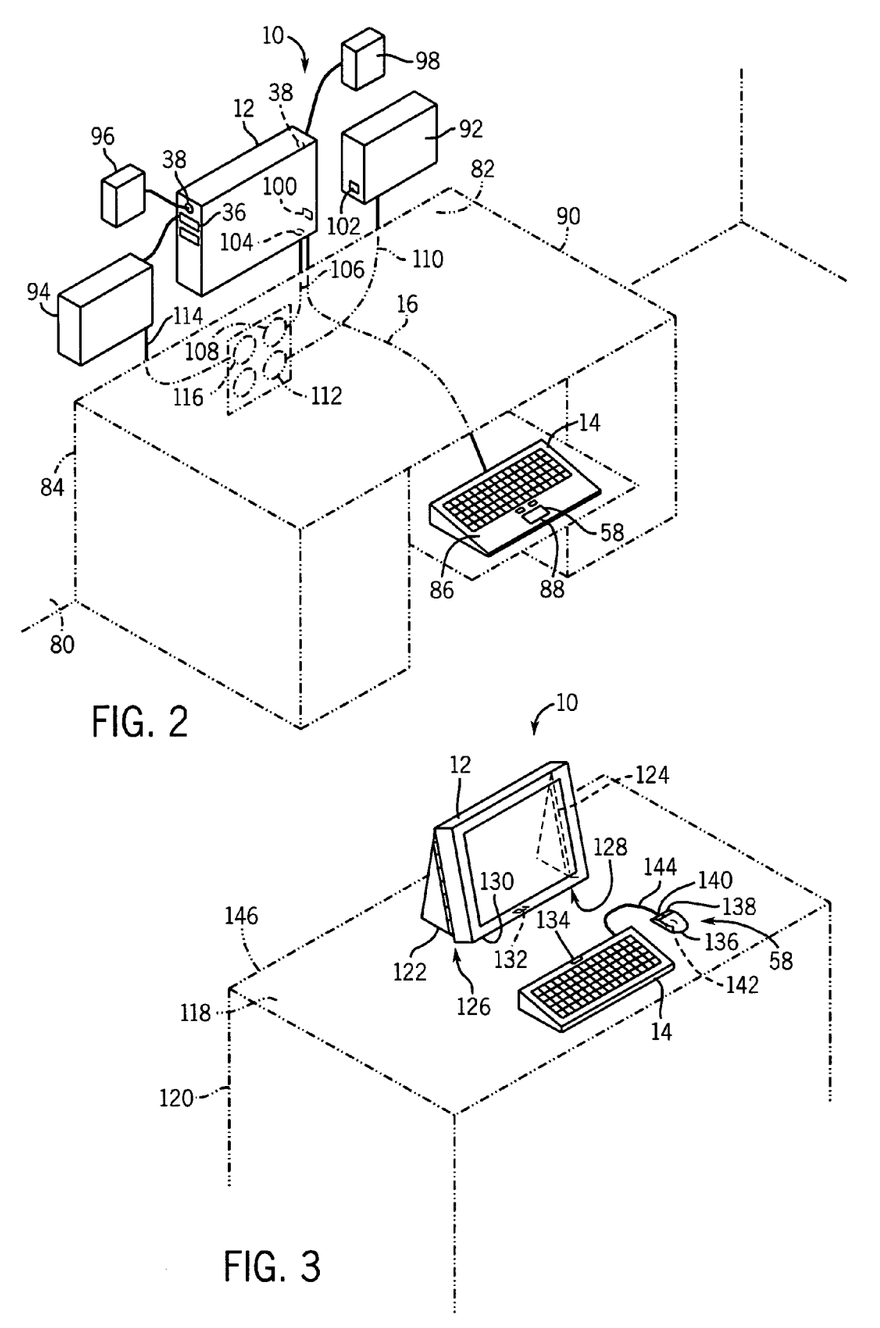
FIG. 2 is a perspective view of the computer system in an exemplary vertical mount orientation.
FIG. 3 is a perspective view of the computer system in an exemplary horizontal mount orientation.

Referring generally to FIG. 2, a perspective view of an exemplary configuration of the computer system 10 is illustrated. As illustrated, the flat panel computer 12 is vertically mounted to a vertical surface 80 adjacent to a rear portion 82 of a table 84. The vertical surface 80 may be a physical wall, a divider for a cubical, or some other sort of vertical support. The table 84 may be an office desk, a countertop, a single or multi-legged table, or some other sort of horizontal support. As illustrated in FIG. 2, the table 84 has a keyboard compartment 86 for removably accessing the keyboard 14 when desired by the user. In this embodiment, the keyboard 14 has a touch pad 88 for the pointing device 58. However, a variety of other pointing devices and keyboard configurations can be utilized within the scope of the present technique. As illustrated in FIG. 2, the positioning of the flat panel computer 12 and the keyboard 14 substantially frees up working space on a horizontal surface 90 of the table 84. The present technique also may be used to free up space occupied by peripheral devices, such as a printer, a scanner, audio/video devices, and a variety of other computer devices. For example, a printer 92, a sheet fed scanner 94 and speakers 96 and 98 can be vertically mounted on the vertical surface 80 adjacent to the flat panel computer 12. The speakers 96 and 98 can be communicatively coupled to the flat panel computer 12 via audio ports, such as the ports 38. The sheet fed scanner 94 can be communicatively coupled to the flat panel computer 12 via the port 36, which may be a serial port, a USB port, an IEEE 1394 port, or another suitable port type. The printer 92 also can be communicatively coupled to the flat panel computer 12 via ports, such as IRDA ports 100 and 102 (infrared ports) disposed on the flat panel computer 12 and the printer 92, respectively. It should be noted that ports 100 and 102 may embody other wireless technologies, such as radio frequency ports, blue tooth ports, optical ports, and other emerging wireless technologies. The computer system 10 and peripherals also may have one or more power supplies. For example, the flat panel computer 12 may have a battery and a power port 104 for a power cord 106, which can be connected to a power supply 108. Similarly, the printer 92 may have a battery and a power cord 110 for coupling the printer 92 to a power supply 112. The sheet fed scanner 94 also can have a battery and a power cord 114 for coupling the sheet fed scanner 94 to a power supply 116. Alternatively, the flat panel computer 12 may provide power to one or more of the peripheral devices, such as the printer 92, the sheet fed scanner 94, and the speakers 96 and 98. Accordingly, the power cords 110 and 114 can be coupled to the flat panel computer 12 rather than to the power supplies 112 and 116, respectively. Thus, the present technique provides a relatively integrated and open workspace. Although the present technique is illustrated in context of an office environment, the unique features of the present technique are also applicable in a variety of other environments.

Referring generally to FIG. 3, a perspective view of the computer system 10 illustrating the flat panel computer 12 in a horizontal mount orientation is illustrated. As illustrated, the flat panel computer 12 is horizontally mounted in a substantially upright orientation on a horizontal surface 118 of a table 120. The flat panel computer 12 is supported in the substantially upright orientation by legs 122 and 124, which are coupled to the flat panel computer 12 at hinges 126 and 128, respectively. Accordingly, the legs 122 and 124 are configured to rotate from a rear face 130 of the flat panel computer 12 to the horizontal mount orientation, as illustrated in FIG. 3. The legs 122 and 124 can be configured to support the flat panel computer 12 at a 90 degree angle with respect to the horizontal surface 118, or the legs 122 and 124 may allow adjustment to a desired viewing angle for the user. Moreover, the flat panel computer 12 may include a port 132 for wireless communication with a port 134 disposed on the keyboard 14.

For example, the ports 132 and 134 may be IRDA ports, 900 Megahertz ports, blue tooth ports, or other wireless port types. Also, the keyboard 14 illustrated in FIG. 3 has the pointing device 58 separated from the keyboard 14, as opposed to an integral keyboard 14 with the pointing device, as illustrated in FIGS. 1 and 2. In this embodiment, the pointing device 58 is a mouse 136 having buttons 138 and 140 and a mouse ball 142 disposed adjacent the horizontal surface 118. Note also, that the pointing device 58 is communicatively coupled to the keyboard 14 via a cable 144, rather than being coupled directly to the flat panel computer 12. This configuration eliminates unnecessary wiring and frees up space. Although the horizontal mount orientation illustrated in FIG. 3 consumes relatively more workspace on the horizontal surface 118 than the vertical mount orientation illustrated in FIG. 2, the flat panel computer 12 can be positioned toward a rear portion 146 of the table 120 while the keyboard 14 can be stowed wherever desired thanks to the wireless communication system.

Figure 4:
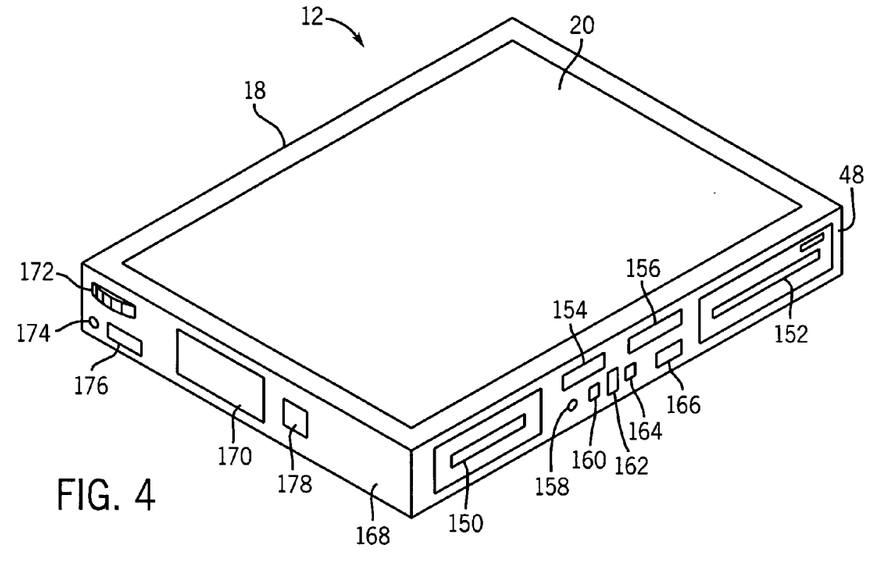
FIGS. 4 and 5 are perspective views of alternate device configurations for the slim computer unit of the present technique.

Referring generally to FIG. 4, a perspective view of an alternate embodiment of the flat panel computer 12 is illustrated. As illustrated, the flat panel computer 12 has a plurality of devices and ports disposed within the enclosure 18. For example, on a side 148 of the enclosure 18, the flat panel computer 12 has a floppy drive 150 and a CD/DVD drive 152 disposed within the enclosure 18. The flat panel computer 12 also has a serial port 154, a parallel port 156, an audio port 158, a phone jack 160, a network jack 162, a USB port 164, and a power port 166 communicatively coupled to internal components of the flat panel computer 12. On a side 168 of the enclosure 18, the flat panel computer 12 has a battery 170 disposed within the enclosure 18. The side 168 also has a volume dial 172, an audio port 174, a USB port 176, and an IRDA port 178 communicatively coupled to the internal components of the flat panel computer 12. Again, it should be noted that the port technologies used above may include any existing or emerging communication technology, including radio frequency, blue tooth, optical, and other wireless communication protocols.

As illustrated in FIG. 4, the flat panel computer 12 may be orientated with the side 148 positioned at the base or at the top of the flat panel computer 12. For example, the flat panel computer 12 can be orientated with the side 148 up or down for the vertical mount orientation illustrated in FIG. 2. However, for a horizontal mount (e.g. a desktop mount), the flat panel computer 12 may be orientated with the side 148 up to allow operability of the ports and devices disposed on the side 148. Note also, that the floppy drive 150 and the CD-DVD 152 can be configured for automatically excepting and rejecting discs from the respective drives to improve the functionally of the drives in vertically orientation.

Figure 5:
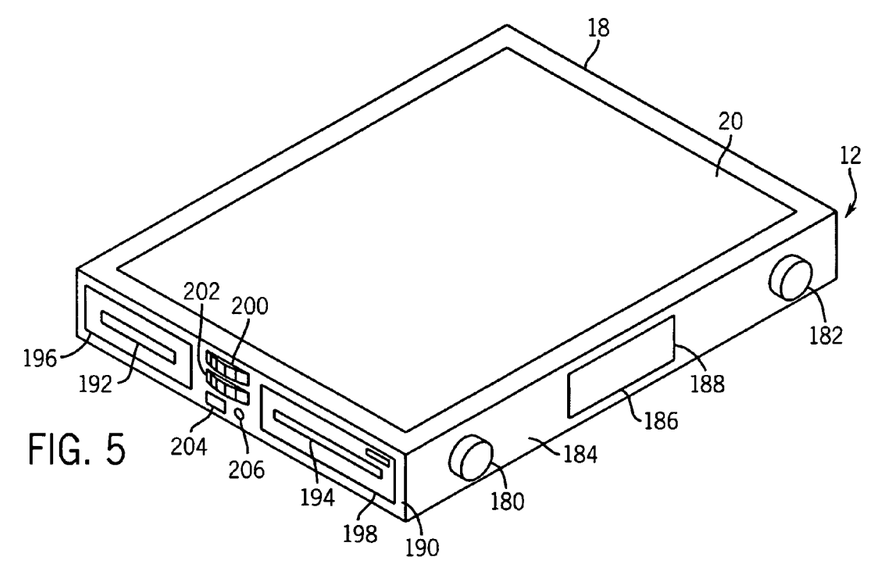

Referring generally to FIG. 5, a perspective view of an alternate embodiment of the flat panel computer 12 is illustrated. In this embodiment, the flat panel computer 12 is configured to improve versatility in various orientations of the computer system 10. For example, the flat panel computer 12 has rubber feet 180 and 182 disposed on a base 184 of the enclosure 18. In the horizontal mount orientation, as illustrated in FIG. 3, the rubber feet 180 and 182 of this embodiment can improve the stability of the upright orientation of the enclosure 18. The flat panel computer 12 also has a battery 186 disposed in a receptacle 188 in the base 184. Other devices that are not frequently used during operation of the computer system 10 also can be disposed in the base 184. Accordingly, space on the sides of the enclosure 18 is preserved for devices frequently used during operation of the computer system 10. For example, on a side 190 of the enclosure 18, the flat panel computer 12 has a floppy disc drive 192 and a CD-DVD drive 194 disposed in receptacles 196 and 198, respectively. The side 190 also has an audio volume dial 200, a display brightness adjustment dial 202, a power button 204, and a reset button 206 for the computer system 10. Accordingly, the embodiment illustrated in FIG. 5 improves the versatility between vertical and horizontal mount orientations.

Figure 6:
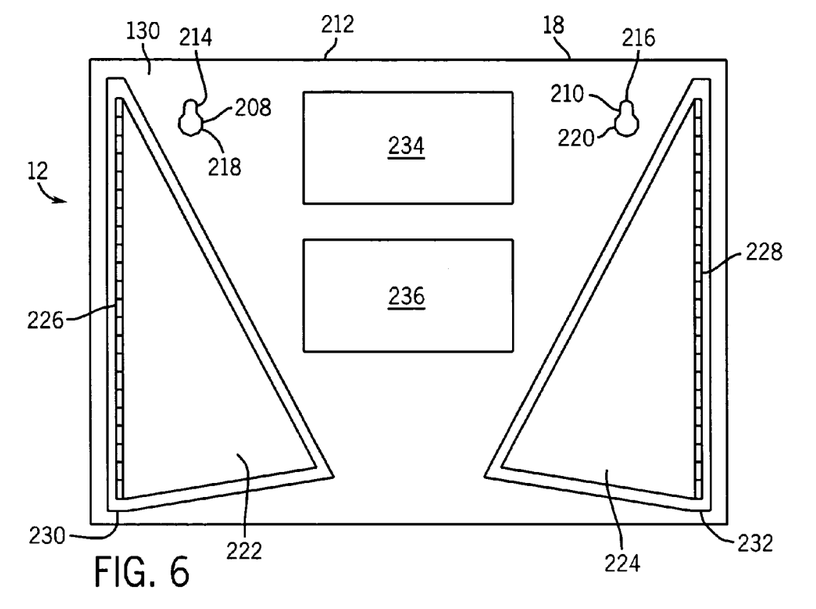
FIGS. 6 through 8 are views of alternate mounting structures for the slim computer unit of the present technique.

Referring generally to FIG. 6, a rear view of the flat panel computer 12 illustrating mounting structures for both a vertical and horizontal orientation of the enclosure 18 is illustrated. As illustrated, the flat panel computer 12 has wall mounts 208 and 210 disposed at an upper portion 212 of the flat panel computer 12. In this exemplary embodiment, the wall mounts 208 and 210 include mounting slots having narrow portions 214 and 216 extending into enlarged portions 218 and 220, respectively. Thus, the wall mounts 208 and 210 can be used to mount the flat panel computer 12 on a pair of nails, screws or other mounting members having an enlarged head coupled to a vertical surface (e.g., a wall). Although the illustrated embodiment includes two wall mounts (i.e., 208 and 210), any number and type of wall mounts can be used within the scope of the present technique. The flat panel computer 12 also has legs 222 and 224 coupled to the rear face 130 via hinges 226 and 228, respectively.

As illustrated, the legs 222 and 224 are disposed in recessed surfaces 230 and 232, respectively, in the rear face 130. Accordingly, the legs 222 and 224 may be substantially flush with the rear face 130 in the stored or retracted position, as illustrated in FIG. 6. In the stored position, the flat panel computer 12 is configured for a vertical mount. However, to horizontally mount the flat panel computer 12, the legs 222 and 224 are rotated about the hinges 226 and 228 outwardly from the rear face 130. In operation, the legs 222 and 224 can be locked into place at an outward position for horizontal mounting. The flat panel computer 12 also may have one or more removable panels to facilitate access to internal components of computer system 10. For example, the embodiment of FIG. 6 has panels 234 and 236, which may provide access to RAM, to the CPU, or to other internal devices. Note also, that a variety of other leg structures can be utilized within the scope of the present technique, such as those illustrated in FIGS. 7 and 8.

Figure 7:
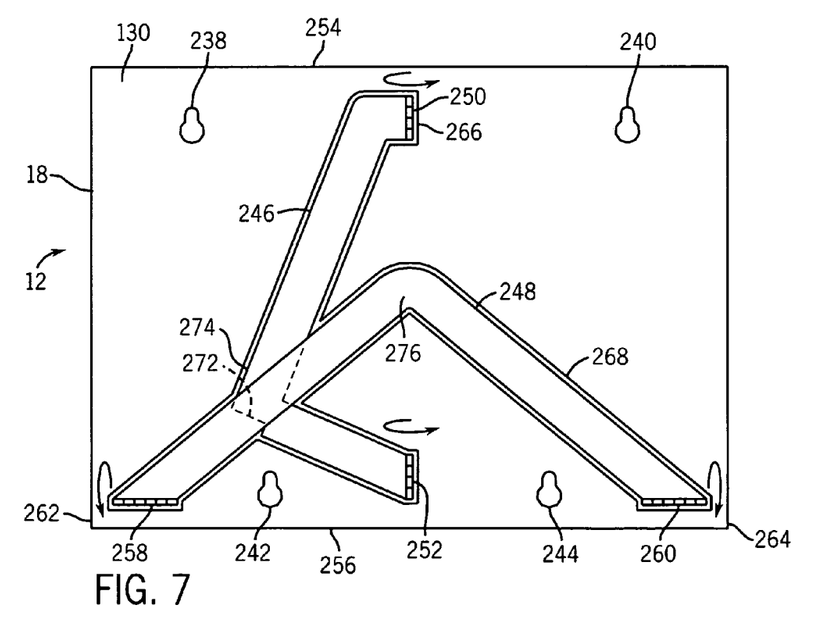

Referring generally to FIG. 7, a rear view of an alternate embodiment of the flat panel computer 12 is illustrated. As illustrated, the flat panel computer 12 has wall mounts 238, 240, 242 and 244 disposed about the perimeters of the rear face 130. The wall mounts 238, 240, 242 and 244 are illustrated as slots having narrow and enlarged portions for securely mounting to a set of screws, nails or other members having enlarged heads coupled to a vertical surface. However, a variety of other wall mounting structures can also be utilized within the scope of the present technique. To horizontally mount the flat panel computer 12, the embodiment illustrated in FIGS. 7 includes a vertical leg 246 and horizontal leg 248. The vertical leg 246 is pivotally coupled to the rear face 130 of the enclosure 18 via hinges 250 and 252 disposed at the top portion 254 and the bottom portion 256 of the enclosure 18, respectively. The horizontal leg 248 is pivotally coupled to the rear face 130 of the enclosure 18 via hinges 258 and 260, which are pivotally coupled at the bottom portion 256 at sides 262 and 264, respectively. Note also, that the vertical leg 246 and the horizontal leg 248 are stored in recessed surfaces 266 and 268, respectively, which reduce the protrusiveness of the legs 246 and 248. Accordingly, the vertical leg 246 and the horizontal leg 248 are retracted such that they do not interfere with a vertical mount of the flat panel computer 12 via the wall mounts 238, 240, 242 and 244.

Figure 8:
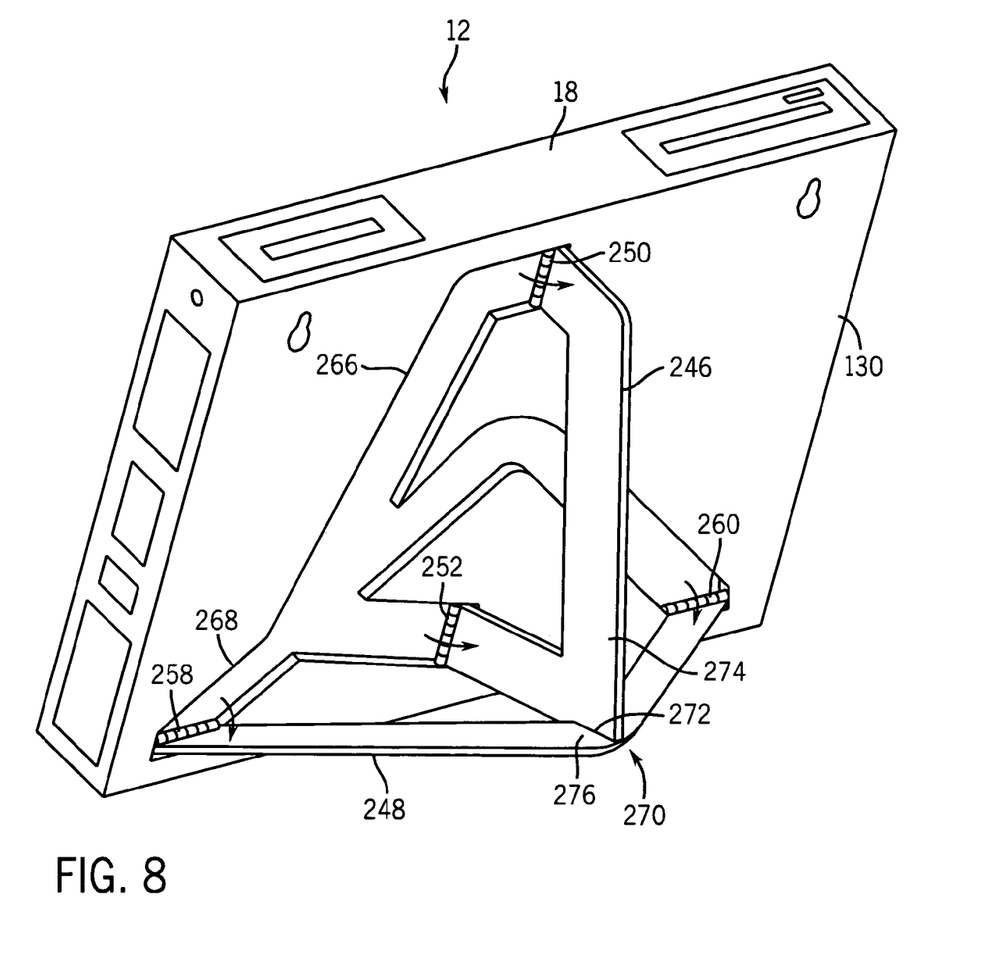

Referring generally to FIG. 8, a perspective view of the flat panel computer 12, as illustrated in FIG. 7 is shown. According to this embodiment of the horizontal mount structure, the horizontal leg 248 can be rotated about the hinges 258 and 260 outwardly from the recessed surface 268 towards a horizontal orientation. The horizontal leg 248 may include a locking mechanism to secure the horizontal leg 248 in the horizontal orientation (or one of several orientations to achieve a desired viewing angle) without the need for the vertical leg 246, yet the vertical leg 246 is provided for additional support and stability in the horizontal mount orientation. Accordingly, the vertical leg 246 can be rotated about the hinges 258 and 260 outwardly from the recessed surface 266 and toward a coupling point 270 where the vertical leg 246 meets the horizontal leg 248.

To secure the vertical leg 246 to the horizontal leg 248 in the horizontal orientation, the vertical leg 246 is provided with a slot 272 at an outer portion 274 of the vertical leg 246. The vertical leg 246 is then coupled to the horizontal leg 248 at a central portion 276 of the horizontal leg 248. Accordingly, the legs 246 and 248 form a triangular support structure behind the flat panel computer 12. Note also, that the vertical leg 246 may include an adjustment mechanism at the hinges 250 and 252 to facilitate multiple vertical positions of the vertical leg 246. Thus, the multiple vertical positions would facilitate multiple horizontal orientations of contact between the legs 246 and 248, which would provide a user with multiple viewing angles for the display. The adjustment mechanism also can be used to adapt to an angled surface (e.g., slightly offset from horizontal). Although exemplary support and mount structures have been illustrated in the preceding figures, a variety of mounting assemblies can be applied to the flat panel computer 12 within the scope of the present technique.

While the invention may be susceptible to various modifications and alternative forms, specific embodiments have been shown by way of example in the drawings and have been described in detail herein. However, it should be understood that the invention is not intended to be limited to the particular forms disclosed. For example, the present technique may be applied to a variety of computer systems, peripheral devices, and other electronic and computing devices, each having a variety of components and features. The present technique also may use a variety of mounting structures to position the particular device in the desired location. Moreover, a broad spectrum of electronic and communication technologies can be employed within the scope of the present technique. For example, wireless communication, blue tooth technologies, hot-plugging and plug-n-play technologies, optical and digital technologies, and other emerging technologies are all within the scope of the present technique. Accordingly, the invention is intended to cover all modifications, equivalents, and alternatives falling within the spirit and scope of the invention as defined by the following appended claims.

What is claimed is:

1. A personal computer system, comprising:
a personal computer integrated at least substantially within a flat panel display having a single panel shaped housing;
a desktop mount integrated into a rear wall of the single panel shaped housing, wherein the desktop mount comprises a pivotal leg angled outwardly from the rear wall at a central region midway between left and right sides of the single panel shaped housing, wherein the pivotal leg comprises a generally horizontal portion and an upwardly angled portion extending from the generally horizontal portion, wherein the generally horizontal portion and the upwardly angled portion are a single leg structure; and
a supplemental pivotal leg interlockable with the pivotal leg at an intermediate region between the generally horizontal portion and the upwardly angled portion.

2. The personal computer system of claim 1, wherein the pivotal leg comprises a generally L-shaped profile.

3. The personal computer system of claim 1, comprising a horizontal leg diverging outwardly from a bottom of the pivotal leg in directions generally toward a front side of the single panel shaped housing.

4. The personal computer system of claim 1, wherein the single panel shaped housing comprises an integral wall mount.

5. The personal computer system of claim 4, wherein the integral wall mount comprises a plurality of wall fastener slots.

6. The personal computer system of claim 1, comprising a computer disc drive disposed in a left or right side of the single panel shaped housing to enable insertion and removal of a computer disc in a lateral direction.

7. The personal computer system of claim 1, comprising an optical disc drive disposed in a side of the single panel shaped housing, wherein the optical disc drive comprises a disc receptacle to enable insertion and removal of an optical disc without insertion and removal of a supporting tray.

8. The personal computer system of claim 1, comprising a plurality of communication ports mounted in the single panel shaped housing, wherein the communication ports include a network port, or a wireless port, or a digital port, or an optical port, or a combination thereof.

9. The personal computer system of claim 1, comprising a plurality of communication ports mounted in the single panel shaped housing, wherein the communication ports include a universal serial bus (USB) port, or an IEEE 1394 port, or a combination thereof.

10. The personal computer system of claim 1, wherein the single panel shaped housing comprises a plurality of internal device access panels.

11. A personal computer system, comprising:
a panel personal computer having a flat panel display and a personal computer integrated at least substantially into one shared panel enclosure; and
a leg coupled to a rear side of the one shared panel enclosure at a region midway between left and right sides of the one shared panel enclosure, wherein the leg comprises a first portion extending from the rear side outwardly to a base position behind the rear side, and the leg comprises a second portion extending from the base position in a direction toward a front side of the one shared panel enclosure, wherein the second portion diverges from the base position in two generally horizontal directions toward the front side of the one shared panel enclosure, wherein the leg is collapsible towards the rear side of the one shared panel enclosure.

12. The personal computer system of claim 11, wherein the first and second portions are a one-piece structure having a generally L-shaped profile.

13. The personal computer system of claim 11, wherein the leg is collapsible into a recess within the rear side of the one shared panel enclosure.

14. The personal computer system of claim 11, wherein the leg comprises a triangular support structure.

15. The personal computer system of claim 11, comprising a bottommost structure having only three feet arranged in a triangular configuration.

16. The personal computer system of claim 11, comprising a computer disc drive disposed in a left or right side of the one shared panel enclosure to enable insertion and removal of a computer disc in a lateral direction.

17. The personal computer system of claim 11, comprising an optical disc drive disposed in a side of the one shared panel enclosure, wherein the optical disc drive comprises a disc receptacle to enable insertion and removal of an optical disc without insertion and removal of a supporting tray.

18. The personal computer system of claim 11, comprising a plurality of keyhole mounting slots extending into the rear side of the one shared panel enclosure.

19. The personal computer system of claim 11, wherein the panel personal computer comprises a network port, a universal serial bus (USB) port, and a phone port.

20. A personal computer system, comprising:
an all-in-one personal computer, comprising:
a computer enclosure consisting essentially of a single panel shaped structure;
a flat panel display integrally mounted inside the computer enclosure;
a computer disc drive disposed in a lateral side of the computer enclosure to enable insertion and removal of a computer disc in a lateral direction; and
a desk mount comprising a leg coupled to a rear side of the computer enclosure at a central region between lateral sides of the computer enclosure, wherein the leg comprises a first portion extending from the central region downwardly to a base position behind the rear side, and the leg comprises a second portion diverging from the base position in two generally horizontal directions toward a front side of the computer enclosure.

21. The personal computer system of claim 20, wherein the second portion has a generally V-shaped geometry.

22. The personal computer system of claim 20, comprising at least one wall mounting opening extending into a rear side of the single panel shaped structure.

23. The personal computer system of claim 22 wherein the at least one wall mounting opening comprises a keyhole shaped slot.

24. The personal computer system of claim 20, wherein the single panel shaped structure comprises a plurality of access panels disposed removably over internal computer components.

25. The personal computer system of claim 20, comprising a plurality of universal serial bus (USB) ports, a network port, an audio port, and a video port integrally mounted in the computer enclosure.

26. The personal computer system of claim 20, comprising an optical port integrally mounted in the computer enclosure.

27. A personal computer system, comprising:
a panel personal computer having a flat panel display and a personal computer integrated at least substantially into one shared panel enclosure;
a leg coupled to a rear side of the one shared panel enclosure at a region midway between left and right sides of the one shared panel enclosure, wherein the leg comprises a first portion extending from the rear side outwardly to a base position behind the rear side, and the leg comprises a second portion extending from the base position in a direction toward a front side of the one shared panel enclosure; and
a bottommost structure having only three distinct support points arranged in a triangular configuration.

* * * * *

UNITED STATES PATENT AND TRADEMARK OFFICE
CERTIFICATE OF CORRECTION

PATENT NO. : 7,149,080 B2 Page 1 of 1
APPLICATION NO. : 11/173015
DATED : December 12, 2006
INVENTOR(S) : Louis R. Jackson, Jr.

It is certified that error appears in the above-identified patent and that said Letters Patent is hereby corrected as shown below:

Title page, Item (73), in "Assignee", in column 1, line 1,
delete "Development," and insert -- Development Company, --, therefor.

In column 9, line 18, in Claim 11, delete "towards" and insert -- toward --, therefor.

In column 10, line 20, in Claim 23, after "claim 22" insert -- , --.

Signed and Sealed this

Sixteenth Day of December, 2008

JON W. DUDAS
*Director of the United States Patent and Trademark Office*